(12) United States Patent
Hinks

(10) Patent No.: US 9,338,214 B2
(45) Date of Patent: *May 10, 2016

(54) MANAGING VIRTUAL BUSINESS INSTANCES WITHIN A COMPUTER NETWORK

(75) Inventor: Paul Hinks, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 862 days.

This patent is subject to a terminal disclaimer.

(21) Appl. No.: 13/017,366

(22) Filed: Jan. 31, 2011

(65) Prior Publication Data

US 2011/0119378 A1    May 19, 2011

Related U.S. Application Data

(63) Continuation of application No. 10/951,405, filed on Sep. 27, 2004, now Pat. No. 7,904,882.

(60) Provisional application No. 60/512,601, filed on Oct. 16, 2003.

(51) Int. Cl.
  *G06F 15/173*  (2006.01)
  *G06F 9/44*  (2006.01)
  *H04L 29/08*  (2006.01)

(52) U.S. Cl.
  CPC .............. *H04L 67/02* (2013.01); *H04L 67/28* (2013.01); *H04L 67/2833* (2013.01)

(58) Field of Classification Search
  CPC ......... H04L 65/00; H04L 69/00; H04L 67/02; H04L 67/28; H04L 67/2833

USPC ......................................... 717/101–103, 127
  See application file for complete search history.

(56) References Cited

U.S. PATENT DOCUMENTS

| | | | |
|---|---|---|---|
| 5,119,377 A | 6/1992 | Cobb et al. |
| 5,222,234 A | 6/1993 | Wang et al. |
| 5,255,389 A | 10/1993 | Wang |
| 5,333,312 A | 7/1994 | Wang |
| 5,850,518 A | 12/1998 | Northrup |
| 5,903,652 A | 5/1999 | Mital |
| 6,032,118 A | 2/2000 | Tello et al. |

(Continued)

FOREIGN PATENT DOCUMENTS

EP    0608614 A2 * 12/1993 ............. H04Q 3/545

OTHER PUBLICATIONS

Peltz, "Web Services Orchestration", Jan. 2003, Hewlett-Packard Co., pp. 1-20.*

(Continued)

*Primary Examiner* — Ted T. Vo
(74) *Attorney, Agent, or Firm* — Weaver Austin Villeneuve & Sampson LLP

(57) ABSTRACT

Methods and apparatus, including computer program products, implementing and using techniques for orchestrating a business process in a computer network. A script describing a business process is received from a client machine over the computer network. The script is compiled into executable program instructions. A reference to the script and data to be operated on by the script is received from the client machine over the computer network. The data is processed in accordance with the script. The result of the data processing is returned to the client machine over the computer network.

19 Claims, 4 Drawing Sheets

(56) References Cited

U.S. PATENT DOCUMENTS

| | | | |
|---|---|---|---|
| 6,055,513 A | 4/2000 | Katz et al. | |
| 6,065,082 A | 5/2000 | Blair et al. | |
| 6,073,142 A | 6/2000 | Geiger et al. | |
| 6,091,714 A | 7/2000 | Sensel et al. | |
| 6,148,411 A | 11/2000 | Ichinohe et al. | |
| 6,226,623 B1 | 5/2001 | Schein et al. | |
| 6,230,203 B1 | 5/2001 | Koperda et al. | |
| 6,233,565 B1 | 5/2001 | Lewis et al. | |
| 6,256,667 B1 | 7/2001 | Wanghlander et al. | |
| 6,260,062 B1 | 7/2001 | Davis et al. | |
| 6,292,789 B1 | 9/2001 | Schutzer | |
| 6,304,969 B1 | 10/2001 | Wasserman et al. | |
| 6,336,135 B1 | 1/2002 | Niblett et al. | |
| 6,338,050 B1 | 1/2002 | Conklin et al. | |
| 6,351,739 B1 | 2/2002 | Egendorf | |
| 6,397,197 B1 | 5/2002 | Gindlesperger | |
| 6,397,254 B1 | 5/2002 | Northrup | |
| 6,421,705 B1 | 7/2002 | Northrup | |
| 6,438,594 B1 | 8/2002 | Bowman-Amuah | |
| 6,449,634 B1 | 9/2002 | Capiel | |
| 6,470,357 B1 | 10/2002 | Garcia, Jr. et al. | |
| 6,470,385 B1 | 10/2002 | Nakashima et al. | |
| 6,499,108 B1 | 12/2002 | Johnson | |
| 6,526,044 B1 | 2/2003 | Cookmeyer et al. | |
| 6,529,489 B1 | 3/2003 | Kikuchi et al. | |
| 6,546,413 B1 | 4/2003 | Northrup | |
| 6,549,944 B1 | 4/2003 | Weinberg et al. | |
| 6,587,838 B1 | 7/2003 | Esposito et al. | |
| 6,633,630 B1 | 10/2003 | Owens et al. | |
| 6,651,087 B1 | 11/2003 | Dennis | |
| 6,665,393 B1 | 12/2003 | Johnson et al. | |
| 6,671,713 B2 | 12/2003 | Northrup | |
| 6,671,746 B1 | 12/2003 | Northrup | |
| 6,704,768 B1 | 3/2004 | Zombek et al. | |
| 6,714,987 B1 | 3/2004 | Amin et al. | |
| 6,718,380 B1 | 4/2004 | Mohaban et al. | |
| 6,735,621 B1 | 5/2004 | Yoakum et al. | |
| 6,763,104 B1 | 7/2004 | Judkins et al. | |
| 6,813,278 B1 | 11/2004 | Swartz et al. | |
| 6,857,072 B1 | 2/2005 | Schuster et al. | |
| 6,877,023 B1 | 4/2005 | Maffeis et al. | |
| 6,886,026 B1 | 4/2005 | Hanson | |
| 6,917,962 B1 | 7/2005 | Cannata et al. | |
| 6,925,488 B2 | 8/2005 | Bantz et al. | |
| 6,934,532 B2 | 8/2005 | Coppinger et al. | |
| 6,948,063 B1 | 9/2005 | Ganesan et al. | |
| 6,952,717 B1 | 10/2005 | Monchilovich et al. | |
| 6,965,878 B1 | 11/2005 | Heuring | |
| 7,028,312 B1 | 4/2006 | Merrick et al. | |
| 7,035,202 B2 | 4/2006 | Callon | |
| 7,088,727 B1 | 8/2006 | Short et al. | |
| 7,099,950 B2 | 8/2006 | Jones et al. | |
| 7,127,613 B2 | 10/2006 | Pabla et al. | |
| 7,152,204 B2 | 12/2006 | Upton | |
| 7,249,195 B2 | 7/2007 | Panec | |
| 7,305,454 B2 | 12/2007 | Reese et al. | |
| 7,516,191 B2* | 4/2009 | Brouk et al. | 709/217 |
| 7,689,711 B2 | 3/2010 | Brouk et al. | |
| 7,788,399 B2 | 8/2010 | Brouk et al. | |
| 7,904,882 B2* | 3/2011 | Hinks | 717/120 |
| 2001/0005358 A1 | 6/2001 | Shiozawa | |
| 2001/0029478 A1 | 10/2001 | Laster et al. | |
| 2002/0013854 A1 | 1/2002 | Eggleston et al. | |
| 2002/0019797 A1 | 2/2002 | Stewart et al. | |
| 2002/0029201 A1 | 3/2002 | Barzilai et al. | |
| 2002/0058277 A1 | 5/2002 | Bathe-Brigitte et al. | |
| 2002/0087371 A1 | 7/2002 | Abendroth | |
| 2002/0091533 A1 | 7/2002 | Ims et al. | |
| 2002/0138166 A1 | 9/2002 | Mok et al. | |
| 2002/0143819 A1 | 10/2002 | Han et al. | |
| 2002/0161611 A1 | 10/2002 | Price et al. | |
| 2003/0018808 A1 | 1/2003 | Brouk et al. | |
| 2003/0037250 A1 | 2/2003 | Walker et al. | |
| 2003/0041178 A1 | 2/2003 | Brouk et al. | |
| 2003/0053459 A1 | 3/2003 | Brouk et al. | |
| 2003/0058277 A1 | 3/2003 | Bowman-Amuah | |
| 2003/0126136 A1 | 7/2003 | Omoigui | |
| 2003/0191816 A1 | 10/2003 | Landress et al. | |
| 2004/0078373 A1 | 4/2004 | Ghoneimy et al. | |
| 2004/0162741 A1 | 8/2004 | Flaxer et al. | |
| 2004/0167987 A1 | 8/2004 | Reese | |
| 2004/0186891 A1 | 9/2004 | Panec et al. | |
| 2004/0243574 A1 | 12/2004 | Giroux et al. | |
| 2005/0005164 A1 | 1/2005 | Syiek et al. | |
| 2005/0080914 A1 | 4/2005 | Lerner et al. | |
| 2005/0086297 A1 | 4/2005 | Hinks et al. | |
| 2005/0086360 A1 | 4/2005 | Mamou et al. | |
| 2005/0138210 A1 | 6/2005 | Shkvarchuk et al. | |
| 2005/0166209 A1 | 7/2005 | Merrick et al. | |
| 2005/0228863 A1 | 10/2005 | Palmeri et al. | |
| 2005/0234928 A1 | 10/2005 | Shkvarchuk et al. | |
| 2006/0021019 A1 | 1/2006 | Hinton et al. | |
| 2006/0031225 A1 | 2/2006 | Palmeri et al. | |
| 2006/0155871 A1 | 7/2006 | Ilkka et al. | |
| 2008/0052775 A1 | 2/2008 | Sandhu et al. | |
| 2009/0019534 A1 | 1/2009 | Bakshi et al. | |

OTHER PUBLICATIONS

Hohpe et al., "Introduction to Composed Messaging Examples", Jun. 2003, retrieved from Internet Archive Wayback Machine, 5 pages.*

Hansen et al., "Process Aggregation Using Web Services", 2002, Springer-Verlag Berlin, Heidelberg, pp. 12-27.*

US Office Action dated Nov. 14, 2007 issued in U.S. Appl. No. 10/858,709.

US Office Action dated Jun. 20, 2007 issued in U.S. Appl. No. 10/951,405.

US Office Action Final dated Oct. 15, 2008 issued in U.S. Appl. No. 10/951,405.

US Office Action dated Jun. 9, 2009 issued in U.S. Appl. No. 10/951,405.

US Office Action Final dated Feb. 25, 2010 issued in U.S. Appl. No. 10/951,405.

US Notice of Allowance dated Nov. 15, 2010 issued in U.S. Appl. No. 10/951,405.

US Office Action dated Sep. 21, 2004 issued in U.S. Appl. No. 10/727,089 (U.S. Pat. No. 7,305,454).

US Office Action dated Jun. 2, 2005 issued in U.S. Appl. No. 10/727,089 (U.S. Pat. No. 7,305,454).

US Office Action Final dated Nov. 28, 2005 issued in U.S. Appl. No. 10/727,089 (U.S. Pat. No. 7,305,454).

US Office Action dated Jul. 3, 2006 issued in U.S. Appl. No. 10/727,089 (U.S. Pat. No. 7,305,454).

US Office Action Final dated Jan. 17, 2007 issued in U.S. Appl. No. 10/727,089 (U.S. Pat. No. 7,305,454).

US Office Notice of Allowance dated Jun. 29, 2007 issued in U.S. Appl. No. 10/727,089 (U.S. Pat. No. 7,305,454).

US Office Action dated Sep. 21, 2004 issued in U.S. Appl. No. 10/728,356 (U.S. Pat. No. 7,249,195).

US Office Action dated Jun. 6, 2005 issued in U.S. Appl. No. 10/728,356 (U.S. Pat. No. 7,249,195).

US Office Action Final dated Sep. 30, 2005 issued in U.S. Appl. No. 10/728,356 (U.S. Pat. No. 7,249,195).

US Office Action dated May 24, 2006 issued in U.S. Appl. No. 10/728,356 (U.S. Pat. No. 7,249,195).

US Notice of Allowance dated May 21, 2007 issued in U.S. Appl. No. 10/728,356 (U.S. Pat. No. 7,249,195).

US Office Action dated Dec. 6, 2007 issued in U.S. Appl. No. 10/808,212.

US Office Action dated Dec. 14, 2004 issued in U.S. Appl. No. 09/820,966.

US Office Action Final dated May 19, 2005 issued in U.S. Appl. No. 09/820,966.

US Office Action dated Jun. 20, 2005 issued in U.S. Appl. No. 09/820,966.

US Office Action Final dated Sep. 30, 2005 issued in U.S. Appl. No. 09/820,966.

US Office Action dated Jul. 3, 2006 issued in U.S. Appl. No. 09/820,966.

(56) References Cited

OTHER PUBLICATIONS

US Office Action Final dated Apr. 18, 2007 issued in U.S. Appl. No. 09/820,966.
US Office Action dated Aug. 27, 2007 issued in U.S. Appl. No. 09/820,966.
US Office Action Final dated Apr. 16, 2008 issued in U.S. Appl. No. 09/820,966.
US Office Action dated Jan. 9, 2009 issued in U.S. Appl. No. 09/820,966.
US Notice of Allowance dated Nov. 16, 2009 issued in U.S. Appl. No. 09/820,966.
US Office Action dated Feb. 9, 2005 issued in U.S. Appl. No. 09/820,964.
US Office Action Final dated Jul. 13, 2005 issued in U.S. Appl. No. 09/820,964.
US Advisory Action dated Sep. 20, 2007 issued in U.S. Appl. No. 09/820,964.
US Office Action dated Dec. 28, 2005 issued in U.S. Appl. No. 09/820,964.
US Office Action Final dated Jun. 27, 2006 issued in U.S. Appl. No. 09/820,964.
US Advisory Action dated Nov. 20, 2006 issued in U.S. Appl. No. 09/820,964.
US Office Action dated Jan. 25, 2007 issued in U.S. Appl. No. 09/820,964.
US Office Action Final dated Jul. 10, 2007 issued in U.S. Appl. No. 09/820,964.
US Office Action dated Dec. 27, 2007 issued in U.S. Appl. No. 09/820,964.
US Office Action Final dated Sep. 3, 2008 issued in U.S. Appl. No. 09/820,964.
US Office Action dated Mar. 30, 2009 issued in U.S. Appl. No. 09/820,964.
US Examiner Interview Summary dated Jul. 24, 2009 issued in U.S. Appl. No. 09/820,964.
US Office Action Final dated Nov. 12, 2009 issued in U.S. Appl. No. 09/820,964.
US Examiner Interview Summary dated Apr. 27, 2010 issued in 09/820,964.
US Notice of Allowance dated May 24, 2010 issued in U.S. Appl. No. 09/820,964.
US Office Action dated Jul. 15, 2010 issued in U.S. Appl. No. 09/820,964.
US Office Action dated Oct. 26, 2004 issued in U.S. Appl. No. 09/820,965.
US Office Action dated Jun. 6, 2005 issued in U.S. Appl. No. 09/820,965.
US Office Action Final dated Sep. 28, 2005 issued in U.S. Appl. No. 09/820,965.
US Examiner's Interview Summary dated Aug. 3, 2005 issued in U.S. Appl. No. 09/820,965.
US Office Action dated Jun. 14, 2006 issued in U.S. Appl. No. 09/820,965.
US Office Action dated Dec. 28, 2007 issued in U.S. Appl. No. 09/820,965.
US Office Action Final dated Jul. 11, 2007 issued in U.S. Appl. No. 09/820,965.
US Examiner Interview Summary dated Oct. 9, 2007 issued in U.S. Appl. No. 09/820,965.
US Notice of Allowance and Examiner's Amendment dated Sep. 8, 2008 issued in U.S. Appl. No. 09/820,965.
US Notice of Allowance dated Dec. 18, 2008 issued in U.S. Appl. No. 09/820,965.
US Office Action dated Jan. 22, 2009 issued in U.S. Appl. No. 09/820,965.
US Office Action dated Feb. 3, 2009 issued in U.S. Appl. No. 09/820,965.
US Office Action dated Feb. 12, 2009 issued in U.S. Appl. No. 09/820,965.
US Office Action dated Feb. 25, 2009 issued in U.S. Appl. No. 09/820,965.
BizTalk Framework Overview (2000) downloaded from Biztalk.org website at http://www.biztalk.org/Biztalk/framework.asp; Retrieved from internet on Nov. 8, 2000, 3 pages.
Coblist:—Cob: Welcome to my photo album! (2000) retrieved from internet at http://www.deatech.com/natural/coblist/coblist-we/2000/0484.html; dated Sep. 25, 2000, pp. 1-2.
CrossGAIN: A New Foundation for the Web (2000), overview downloaded from Crossgain.com website at http://www.crossgain.com; Retrieved from internet on Sep. 22, 2000, 1 page.
CrossWeave™—Extending the Enterprise (2001), company overview downloaded from CrossWeave.com website at http://www.crossweave.com/company_overview.html; Retrieved from internet on Apr. 1, 2002, 1 page.
ebXML: Creating a Single Global Electronic Market (2000) OASIS UN CEFACT, copyright ebXML 2000, ebXML Technical Architecture Team, Oct. 17, 2000, 46 pages.
"Evite.com Launches Free Web-based Group Activity Organizer," retrieved from the Internet at www.proquest.com, *PR Newswire*, ProQuest Doc. ID: 43258854, Jul. 19, 1999, pp. 1-2.
"Evite Relies on MySQL to Deliver Millions of Invitations," retrieved from www.mysql.com, *My SQL, The World's Most Popular Open Source Database*, MySQL.com, 1998, 4 pages.
"Evite Tour," Mar. 2001, retrieved from the Internet at http://web/archive.org/web/2001027073617/www.evite.com/tour?printAll+ok, Evite Mar. 2001, pp. 1-9.
"Excite@Home: Excite's #1 webshots provides users with comprehensive photo capabilities; Unveiling "My Photos" where Excite users can create personal albums, share photos, search photos and order quality prints by Ofoto," [Retrieved from internet at www.proquest.com, on May. 24, 2005] ProQuest Doc. ID: 54811626, Jorgensen, M2 Presswire, Coventry: Jun. 5, 2000, 3 pages.
Festa, Paul (2000) "Start-up gains Netscape funding, Microsoft engineers,"CNET News.com, dated Sep. 10, 2000 downloaded from CNET.com website at http://news.com.com/2100-1017-245521.html; Retrieved from internet on Apr. 1, 2002, 2 pages.
GlueCode: Our Mission and Vision (2002) downloaded from Gluecode.com website at URL:http://www.gluecode.com/company/mission_vision.html, p. 1 [Retrieved from internet on Apr. 1, 2002], 1 page.
Gluecode™ (2000), Company overview and product guide downloaded from Glucode.com website at http://www.glucode.com; Retrieved from internet on Sep. 22, 2000, 18 pages.
Grand, Mark (1993) MIME Overview, downloaded from Mindspring.com website at http://www.mindspring.com/~mgrand/mime.html; Revised Oct. 26, 1993; Retrieved from internet on Mar. 1, 2001, 13 pages.
Greef, Arthur (1998) "Partner Interface Process Technical Architecture," RosettaNet/PIP Technical Architecture.doc dated Apr. 1, 2002, pp. 1-12.
Greenbaum, Joshua (2000) "Next Generation E-Business Trading Networks: Intelligent Hubs and Viquity's Nexus Solution," Enterprise Applications Consulting, Berkeley, CA (www.eaconsult.com), pp. 1-20.
IBM Technical Disclosure Bulletin, "Method of Enabling Automated Invocation of Web Services," Issue No. 455, pp. 1-6, Mar. 2002.
ipo.com—Venture Portfolio Company Profile (2002), downloaded from ipo.com website at http://www.ipo.com/venture/_pcprofile.asp?p=IPO&pc=20323; Retrieved from internet on Apr. 1, 2002, 1 page.
La Quey, Robert E. (1999), "SML: Simplifying XML," retrieved from Internet at www.XML.com, dated Nov. 24, 1999, pp. 1-6.
McGregor, Carolyn (Jun. 2003), "A Method to extend BPEL4WS to enable Business Performance Measurement", Center for Advanced Systems Engineering, University of Western Sydney, Australia, pp. 1-7.
Newcomer, "Understanding Web Service," Addison-Wesley, Boston, pp. 1-46, 2002.
Peltz, Chris (Jul. 2003), "Web Service Orchestration and Choreography—A look at WSCI and BPEL4WS", www.wsj2.com, pp. 1-5.

(56) References Cited

OTHER PUBLICATIONS

Slam Dunk Networks (2000), Company overview and product guide downloaded from Slamdunknetworks.com website at http://www.slamdunknetworks.com; Retrieved from internet on Sep. 22, 2000, 15 pages.

Slam Dunk Networks$^{SM}$: A global Infrastructure for the Guaranteed Delivery of B2B Transactions over the Internet, Copyright 2000 Slam Dunk Networks, Inc., 19 pages.

Stross, Kenner (2000) "Managed B2B Infrastructure Technical Architecture," Jul. 31, 2000, Transactplus™ business quality internet, Transact Technical Architecture, pp. 1-14.

"Trails.com Teams Up With Evite to Offer Email Trip Planning Service," retrieved from Internet at www.trails.com, *Homes,* 2000.

TransactPlus Network (2000), Company overview and product guide downloaded from TransactPlus.com website at http://www.transactplus.com; Retrieved from internet on Sep. 22, 2000, 13 pages.

Viquity Dynamic Commerce Network™ (DCN) (2000), Company Overview and Service Description downloaded from Viquity.com website at http://www.viquity.com/solutions/architecture.html; Retrieved from internet on Sep. 22, 2000, 2 pages.

Viquity Press Release (2000) "Viquity Demonstrates Power of Hub Technology in ebXML Proof-of-Concept," dated Dec. 12, 2000, downloaded from Viquity.com website at http://www.viquity.com/news_events/pr_detail.asp; Retrieved from internet on Apr. 1, 2002, 2 pages.

\* cited by examiner

MANAGING VIRTUAL BUSINESS INSTANCES WITHIN A COMPUTER NETWORK

CROSS-REFERENCE TO RELATED APPLICATIONS

The present application is a continuation of and claims priority to U.S. patent application Ser. No. 10/951,405 for MANAGING VIRTUAL BUSINESS INSTANCES WITHIN A COMPUTER NETWORK, by Paul Hinks, filed Sep. 27, 2004, which claims priority under 35 U.S.C. §119 from U.S. Provisional Patent Application No. 60/512,601 for APPARATUS AND METHODS FOR MANAGEMENT OF VIRTUAL BUSINESS INSTANCES WITHIN A COMPUTER NETWORK filed Oct. 16, 2003, the entire disclosures of which are incorporated herein by reference for all purposes. The present application is also related to U.S. Pat. No. 7,689,711 for SYSTEM AND METHOD FOR ROUTING MESSAGES BETWEEN APPLICATIONS filed Mar. 30, 2001, to U.S. Pat. No. 7,788,399 for SYSTEM AND METHOD FOR MAPPING SERVICES filed Mar. 30, 2001, and to U.S. Pat. No. 7,516,191 for SYSTEM AND METHOD FOR INVOCATION OF SERVICES, the entire disclosures of which are incorporated herein by reference for all purposes.

BACKGROUND

The present invention relates to techniques for enabling communication between web services in a network environment.

The web service provider market is one of the fastest growing segments of the software industry. Web service providers make enterprise applications, such as human resources administration, recruiting, travel and expense management, sales force automation, and so on, available to customers over the web on a subscription basis, or for free. These enterprise applications are fully managed and hosted by the web service providers, which results in significant cost savings for enterprises using the web services and eliminates many of the issues requiring individual enterprise application integration (EAI) solutions.

Some web service providers merely host and manage third-party packaged software for their customers (i.e., "managed hosters"). Others build new applications from the ground up to take advantage of the benefits and cost-savings of the web service provider model.

Client applications can locate the web services using a UDDI (Universal Description, Discovery, and Integration) service, which is based on XML (eXtended Markup Language) and SOAP (Single Object Access Protocol). XML is a markup language for documents containing structured information, that is, the information and an indication of its role, and is a common way to provide information over wide area networks, such as the Internet. SOAP is an XML-based protocol for exchanging information in a decentralized, distributed environment. SOAP can be used in combination with a variety of protocols, but its most frequent use is in conjunction with HTTP (Hyper Text Transfer Protocol). Web service providers can register contact addresses and descriptions of the provided web services in a UDDI directory, and prospective clients can use the UDDI directory as a "phone book for web services," and look up web services that fit the clients' needs.

Web services are typically described in a Web Service Description Language (WSDL), which is an XML-based language format. WSDL enables separation of the description of the abstract functionality offered by a web service from concrete details of a service description, such as "where" and "how" the functionality is offered. WSDL describes web services starting with the messages that are exchanged between the web service provider and a requestor. The messages are first described abstractly and are then bound to a concrete network protocol and message format. A message consists of a collection of typed data items. A message exchange between the web service provider and the requestor is referred to as an operation. A collection of operations is a portType. Collections of portTypes are grouped and referred to as a service. A web service represents an implementation of a service and contains a collection of ports, where each port is an implementation of a portType, which includes all the concrete details the requestor needs in order to interact with the web service.

In many cases, a client may need to contact several web services to obtain information that is needed by the client for a particular purpose. For example, a client can send out a request for quote (RFQ) message to several web services to obtain quotes for a particular product or service that the client would like to obtain, and based on the results select the most affordable product or service supplier, or the supplier that offers the shortest delivery time, and so on. Another example is a client that sends a loan application to a risk assessment web service, which evaluates the application. Clients with a 'low' risk assessment are automatically accepted, whereas clients with a 'medium' or 'high' risk assessment are initially denied and asked to contact a second web service for further evaluation. The second web service returns a final result, such as 'yes' or 'no' to the client. In most cases where several web services are used to gather information, the client is responsible for coordinating the contacting of them, and making sure that the web services are addressed in a proper sequence, for example, as outlined in the above loan application example. A further complication is that the different web services may use different communication models, such as synchronous communication or asynchronous communication. The web services may also request different input values, such that the client must modify the request for each individual web service that is being contacted. Thus, it would be desirable to further automate processes in which the results from several web services are used.

SUMMARY

In general, in one aspect, the invention provides methods and apparatus, including computer program products, implementing and using techniques for orchestrating a business process in a computer network. A script describing a business process is received from a client machine over the computer network. The script is compiled into executable program instructions. A reference to the script and data to be operated on by the script is received from the client machine over the computer network. The data is processed in accordance with the script. The result of the data processing is returned to the client machine over the computer network.

Advantageous implementations can include one or more of the following features. The business process can involves one or more web services that are accessible over the computer network, and processing the data can include passing the data to at least one web service and obtaining a response from the web service. Any responses received from the one or more web services can be aggregated into an aggregated response and the aggregated response can be transmitted back to the client machine over the computer network. An error message can be returned to the client machine if one or more of the following conditions occur: the data has an incorrect format for the script, a compilation error occurs during the compilation of the script, and the reference identifies an invalid script. The script and the data to be operated on by the script can be received in a single message from the client machine. The script can be received in a first message from the client machine, and the compiled script can be stored in a business process engine and be made available for multiple invocations with different sets of data received from different client machines. The script can be expressed in a business process execution language format. The script and the data can be received asynchronously from the client machine over a push handler in the computer network. The response can be transmitted to the client machine asynchronously over a post handler in the computer network.

The resources used in the processing of the data can be monitored and the processing can be terminated if the resource usage exceeds a predetermined threshold value. An extension functionality can be provided for facilitating the interaction between the client machine, the network, and the one or more web services, where the extension functionality includes one or more of: activities describing actions to be performed during the processing of the data, expressions for extracting computer network specific information, and correlations for associating instances of scripts with messages that fulfill specific criteria. Fault catchers can be provided that identify errors during the orchestration of the business process of one or more of the following types: errors encountered during the receipt of a message from a client machine, errors encountered during processing of a message inside the computer network, errors encountered during delivery of a message inside the computer network, errors encountered during routing of a message inside the computer network, and errors indicating that a message has expired before it was delivered to a web service or before a response was received from a web service. The computer network can be a local area network or a wide area network.

In general, in another aspect, the invention provides a business process engine. The business process engine receives a script describing a business process from a client machine over the computer network, compiles the script into executable program instructions, receives a reference to the script and data to be operated on by the script from the client machine over the computer network, processes the data in accordance with the script, and returns the result of the data processing to the client machine over the computer network.

In general, in another aspect, the invention provides a message routing system. The message routing system includes one or more client computers, one or more web services, a business process engine, and an integration service network. The client computers send and receive messages including business process orchestration instructions and data to be operated on by the business processes. The web services receive and process messages in accordance with the business process orchestration instructions. The business process engine receives a message including business process orchestration instructions from a client machine, receives a message including data to be operated on by the business process orchestration instructions from a client machine, and orchestrates the business process in accordance with the received business process orchestration instructions. The orchestration includes passing the received data to at least one web service and obtaining a response from the web service, aggregating any responses received from the at least one web service, and passing the aggregated response to the client computer. The integration service network routes messages between the client computers and the business process engine, and between the business process engine and the one or more web services The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Overview

Figure 1:
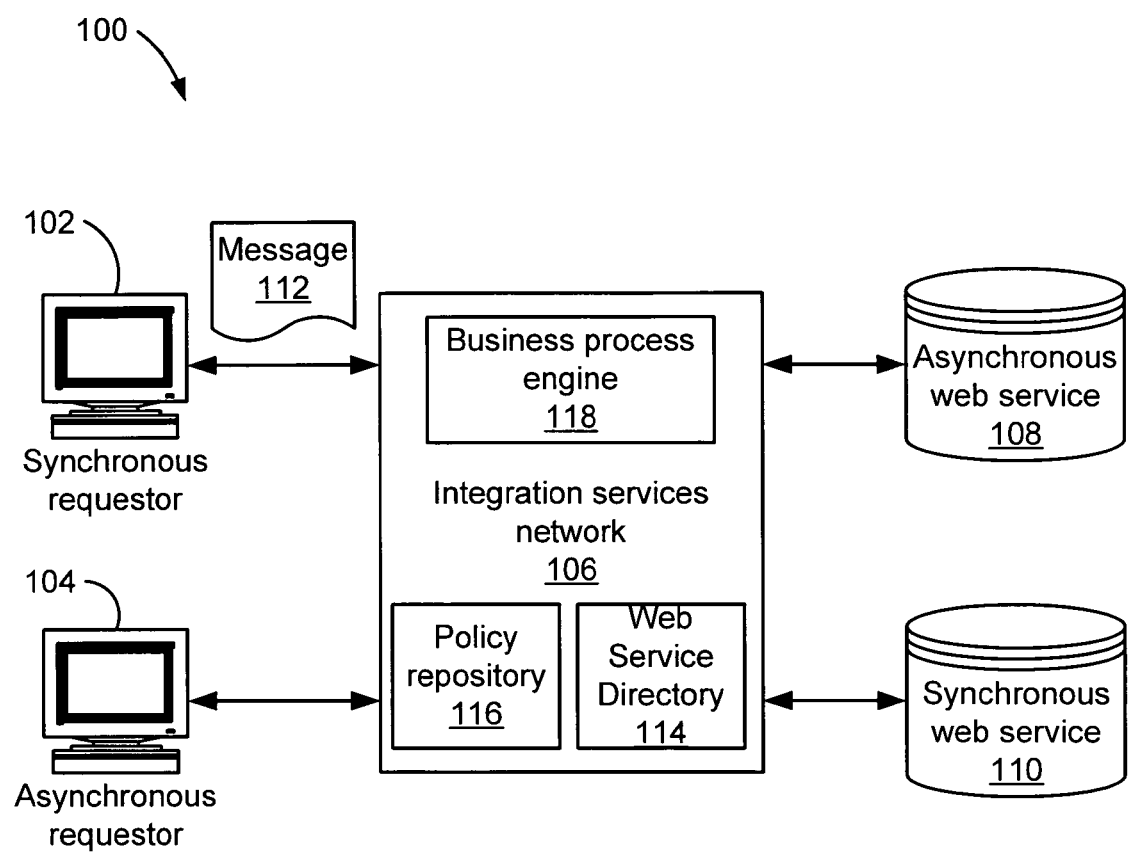
FIG. 1 shows a schematic diagram of a system in which the invention can be implemented.

The invention relates to a Business Process Engine (BPE) for orchestrating business processes that involve multiple services in a computer network. The BPE allows complex business processes to be created and run inside a computer network, such as an integration services network, which will be described in further detail below. The BPE adds logic and flow control to the routing capabilities of the integration services network, while at the same time leveraging the integration service network's reliability, once-only delivery, and correlation features. Without the BPE, the integration services network can perform simple point-to-point messaging, such as from a client computer to a web service. With the BPE included in the integration services network, the integration services network can support powerful business process choreography, such as delivering a message from a client computer to multiple web services and aggregating the obtained responses before transmitting them to the client computer that sent the original message.

In use, the business process engine (BPE) allows a user to orchestrate a business process that involves calls across multiple processes. A client computer sends a single message to the BPE, which can in turn invoke many services over a long period of time, correlate all of the requests and responses to and from the services, and then return a response representing the aggregated results of the processing to the client that issued the message. This greatly simplifies the tasks the client computer is requested to perform. All the invocations of the services occur through the integration services network. Thus, it is completely opaque to the client what services within the integration services network are addressed and what communication format the different services support. It is also not necessary for the clients to provide additional headers for correlation or process management, which would typically be necessary outside the integration services network. The messaging within the integration services network and the BPE, services, and clients, is performed asynchronously, but can appear to the client as being synchronous or asynchronous. The messages can be any XML formatted messages, such as purchase orders, that might require several other processes to be invoked (such as checking the suppliers, availability, and price of individual parts needed for a product). Messages within the integration services network can be automatically resent, which takes away the burden from the client to keep a record of which services have received the message and which services have not received the message.

The invention will now be described by way of example with reference to specific implementations that are illustrated in the accompanying drawings. While the invention is described in conjunction with these specific implementations, it will be understood that this description is not intended to limit the invention to the described implementations. On the contrary, this detailed description is intended to cover alternatives, modifications, and equivalents as may be included within the spirit and scope of the invention as defined by the claims.

FIG. 1 shows a schematic diagram of a system (100), in which the invention can be implemented. As can be seen in FIG. 1, the system (100) includes a requestor (102), or client, that uses a synchronous communication model to access web services, and a requestor (104), or client, that uses an asynchronous communication model to access web services. The system further includes a web service (108) that is configured to be accessed asynchronously, and a web service (110) that is configured to be accessed synchronously. It should be noted that only two requestors and two web services are shown for simplicity. In a typical situation, typically, many web services and many requestors are present.

The system (100) further includes an integration services network (106), for enabling the requestors (102; 104) to communicate with the web services (108; 110) irrespective of the communication methods supported by the individual requestors and web services. The integration services network (106) is accessible for the requestors (102; 104) and the web services (108; 110) over a local area network, such as an intranet, or over a wide area network, such as the Internet. The integration services network (106) facilitates interoperability using a wide variety of web services technologies and standards including, for example, SOAP, WSDL, WS-Security, WS-Policy, and Business Process Execution Language (BPEL), and mediates the technology differences in data formats, communications protocols and business policies through a set of established and defined policies. The system (100) can be either an "open system" or a "closed system." In an open system, typically, the requestors (102; 104) and web services (108; 110) are owned and/or managed by entities distinct from each other and distinct from the owner of the integration services network (106). In the closed system, the requestors (102; 104) and web services (108; 110) are typically owned and/or managed by the owner of the integration services network (106). Combinations of open and closed system are also possible, in which there are some commonly owned and/or managed components, and some components that are owned and/or managed by different entities.

As can be seen in FIG. 1, the integration services network (106) acts as an intermediary for a message (112) that is sent from a requestor (102; 104) to one or more web services (108; 110). The message can, for example, be a request for information that is sent by a specific requestor (102) to a specific web service (108; 110) that is hosted at a remote location.

In some implementations, the integration services network (106) can specify which requestors (102; 104) have permission to access the web services (108; 110). For example, the integration services network (106) can provide security management including authentication, authorization and security policy enforcement at various points in a message's (112) lifecycle inside the integration services network (106), for example, when a message (112) is sent into the integration services network (106) from a requestor (102; 104), and when the message (112) is routed to its destination web service (108; 110). In one implementation, the policies needed for the integration services network (106) to perform security management operations are stored securely in a policy repository (116) in the integration services network (106). According to various implementations, the requestors (102; 104) and the providers of the web services (108; 110) need not be aware of the message format requirements of the party to which the message (112) is sent, nor of any message format translation taking place in the integration services network (106).

In addition to providing mechanisms for mediating messages (112) sent between requestors (102; 104) and web services (108; 110), the integration services network (106) also preferably includes a web service directory (114) for storing various information regarding the web services (108; 110) that are accessible through the integration services network (106). Such information can include, for example, information similar to the UDDI information, which facilitates locating web services (108; 110) for requestors (102; 104), WSDL files for the different web services (108; 110), and policies that control which requestors (102; 104) and web services (108; 110) can interact, and how the interaction occurs. The integration services network (106) preferably also includes mechanisms for creating and combining web services (108; 110), registering requestors (102; 104) and their identifying information, and handling messages (112) routed between web services (108; 110) and/or requestors (102; 104). The directory (114) can be created from one or more databases stored on one or more memory devices on one or more computing platforms. Implementations of the integration services network (106) can also include components enabling complex routing and business process management, which both have been described in the above-referenced patent applications.

The integration services network (106) also contains a business process engine (BPE) (118). In one implementation, the BPE (118) allows a client (102) to orchestrate business processes written in IBM's Business Process Execution Language (BPEL) within the integration services network (106). Information on developing the BPEL processes can be found in the document "Business Process Execution Language for Web Services version 1.1." It should be noted that BPEL is merely used herein as an example of a language suitable for expressing business processes. Other implementations of the BPE (118) can use other languages, such as JAVA™ or JavaScript™ and otherwise operate according to similar principles as the BPE (118) implementation using the BPEL language described herein.

In addition to supporting the BPEL language, the BPE (118) provides extensions that facilitate the orchestration of the business process within the integration services network (106). As will be discussed in further detail below, in one implementation, the BPE (118) can be invoked in one of two ways, using a direct or a virtual mode. In both cases, the invocation message is sent to the BPE (118) through the integration services network (106). In this implementation, the BPE processes reference web services (108; 110) that are registered on the integration services network (106), and can therefore be expressed in a simplified way, as will be seen below.

In the direct mode, the BPE (118) receives both its instructions and its data in a single message (112), that is, the message (112) contains a header or body telling the BPE (118) where to find the instructions needed by the BPE (118) to operate on the received message (112), as well as the data to be orchestrated. The BPE (118) creates an instance of a router that exists in the context of that message (112) only. The message (112) is orchestrated according to the instructions and at the termination of the orchestration sequence the router instance is destroyed. All messages created by the router are addressed from, and preferably seen in reporting as from, the BPE (118) itself.

In the virtual mode, the BPE (118) creates an instance of the BPEL instructions, which can be invoked multiple times with different sets of data. The invocation message containing the data to be orchestrated is sent to a network address for the BPE process in the integration services network (106), and results in a new instance of the route being created to orchestrate that message (112). All messages that are subsequently created by the BPE (118) during its operation are addressed from, and shown in reporting as being from the BPEL process associated with the orchestration instructions. As will be described in further detail below, the exact behavior of the BPE (118) varies according to whether the message (112) is a request or notification. In some cases, the BPE (118) returns a response while in others no response is returned.

FIG. 1 has been described with reference to web services. However, it should be clear that the concepts described above can be applied to any type of "service," such as any computer application, process, entity, or device accessible to other applications, processes, entities, or devices through an interface such as an application programming interface (API), user interface, or Internet web user interface by any of a variety of protocols over a network within an entity or over the Internet. A service can also include multiple methods or applications on a single device or distributed across multiple devices.

Additional mechanisms and techniques for provisioning services and for enabling disparate entities to interact according to the invention are described in U.S. patent application Ser. Nos. 09/820,964, 09/820,965, 09/820,966, 10/727,089, 10/728,356 and 10/742,513, which are incorporated herein by reference for all purposes. Any of the mechanisms described in these referenced applications can easily be applied with the techniques described herein.

General Behavior of the BPE

In one implementation, the BPE (118) receives its messages (112) from the push handler and replies asynchronously through the post handler of the integration services network (106). In another implementation, the BPE (118) does not communicate with the integration services network (106) through the push and post handlers, but is instead integrated into the core router of the integration services network (106), such that the business processes are executed in line with the transfer of messages through the integration services network (106). That is, the BPE (118) gets invoked, if requested, at the point at which routing of the received messages is performed. In both implementations, the BPE (118) only receives its messages (112) from the integration services network (106). The BPE (118) can also be invoked with either notifications or requests, for example, with important consequences on behavior, as will be discussed below. The BPE (118) automatically extends the session of the message (112) it was invoked with when the BPE (118) performs further service invocations.

In one implementation, the BPE (118) monitors the amount of resources used by the BPE (118) and terminates should the resources exceed a level defined in the configuration file for the BPE (118). This constraint can define the limit for operations, such as the multicast, so that the limit on the number of messages (112) that can be multicast is dependent on the messages' size.

Should an error occur in the execution of a Business Process script, the error can be handled by a defined handler for that error, if there is one. In the implementation where the BPE (118) is invoked through the push and post handlers, should an error occur while trying to post a message (112) to the integration services network (106), the post can be re-tried a number of times after a defined time interval. These values can be defined in a configuration file. After the retry limit is reached, the last synchronous error returned by the post attempt is returned to the script for handling according to the normal error handling rules. In the implementation where the BPE (118) is integrated into the core router of the integration services network (106), if an error occurs, the error is handled by a defined error handler for that particular error type, if there is such an error handler. If no error handler has been defined for the particular error type, the error is returned to the invoker of the business process, that is, to the client machine (102; 104) sending the request to the integration services network (106).

In all invocation modes, the BPE (118) can return errors. The errors can be messages themselves and can be part of the automatic correlation extensions, tying the errors to the overall process context. These errors can include expected errors, unexpected errors, and/or runtime errors. Expected errors are returned to the BPE (118) from a sub-invocation, which may be an expected part of a business process. Unexpected errors are returned to the BPE (118) from a sub-invocation, which can be returned if a handler for that error is not found, causing the process to terminate abnormally. Runtime errors typically result from an invalid operation, such as referencing an uninitialized variable. Several examples of runtime errors are defined in the BPEL specification. In addition, in each mode, various other errors can be returned as will be described below. All the errors can be returned as SOAP faults.

BPE Operation in the Direct Invocation Mode

The direct invocation mode is used when a SOAP request or notification message (112) is sent directly to the BPE (118) and contains an <orchestrate> element in the header or body of the message. The <orchestrate> element contains details of a script that the BPE (118) must load as its instructions, and the remainder of the message to be acted upon by the script. The script can be provided in the message, or the message can contain a hypertext reference (href) attribute describing where the script to be instantiated can be found. The exact behavior of the BPE (118) varies according to whether the message (112) is a request or a notification and whether the <orchestrate> element is in the body or a header of the message (112). In some cases, the BPE process returns a response to the client while in other cases no response is returned. All connection security levels supported by the integration services network (106) are also supported by the BPE (118) in the direct invocation mode.

Figure 2:
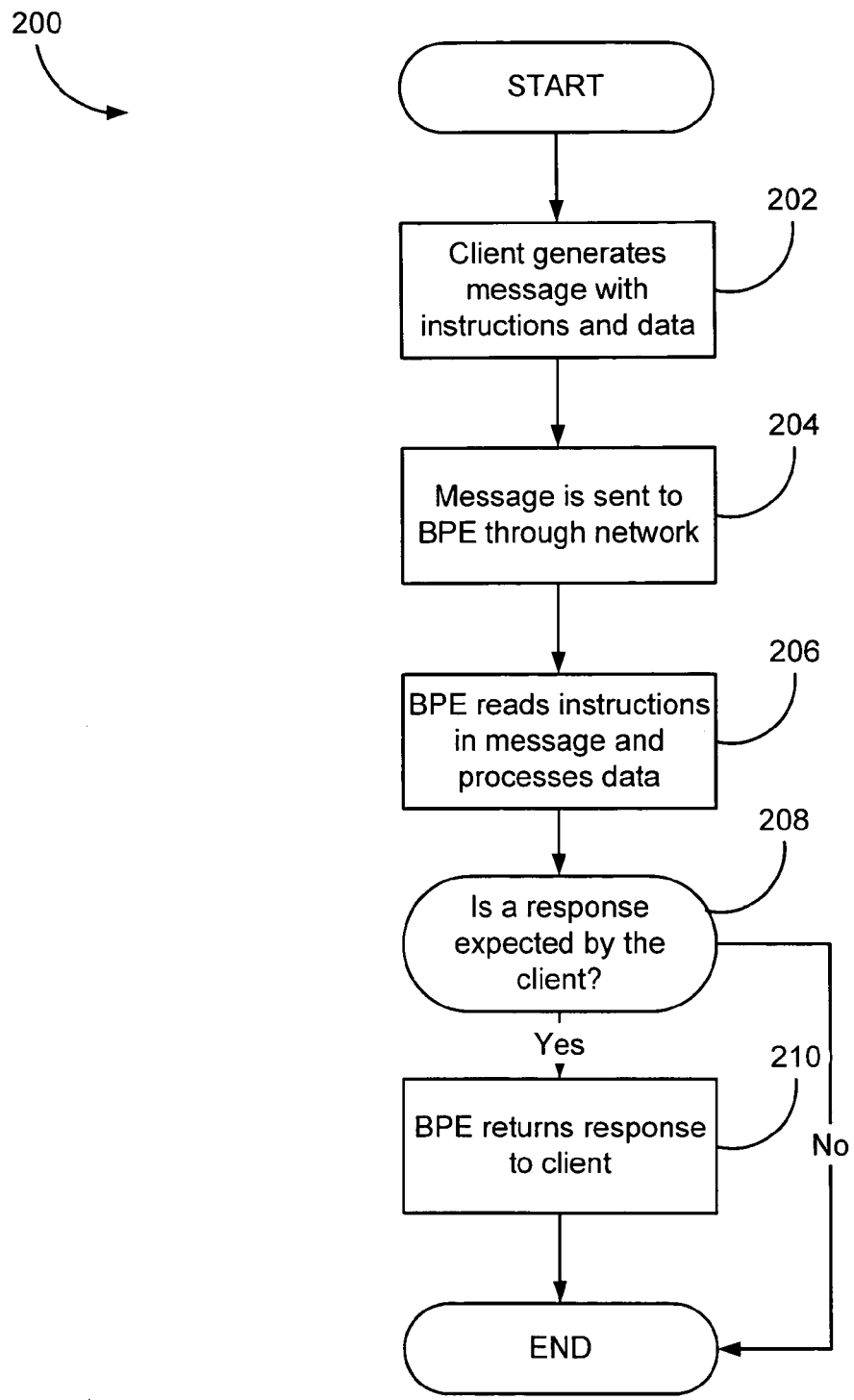
FIG. 2 is a flowchart that shows a schematic process for how the BPE operates in the direct invocation mode.

FIG. 2 is a flowchart that shows a schematic process (200) for how the BPE (118) operates in the direct invocation mode. As can be seen in FIG. 2, the process starts with the client generating a message (112) that contains operating instructions to the BPE (118) in the form of a script, and some data to be operated on (step 202). As was described above, the message (112) contains an <orchestrate> element, which can be in the header of the message, or in the body of the message. The message (112) is then routed to the BPE (118) through the integration services network (106) (step 204).

The BPE (118) reads the script from the message, or from the reference location provided in the message and processes the data in the message in accordance with the script (step 206). Depending on the type of message (112) and where the <orchestrate> element is located within the message (112), the BPE (118) behaves differently. When the <orchestrate> element is in the header, the BPE (118) assumes that it is not the final recipient of the message (112). If there is a response from the BPE (118) when the data in the message is processed in accordance with the defined script, however, the BPE (118) will return that response to the client. If there is no response, the header is removed from the message (112) and the remainder of the message (112) is returned to the client (102). If the invoking message (112) is a notification, no response is returned in either case. When the <orchestrate> element is in the body of a notification message (112), no response is returned. On the other hand, if the <orchestrate> element is in the body of a request message (112), a response is always returned. The returned response includes the response from the orchestration activity (that is, from the web services (108; 110) contacted by the BPE (118) during the orchestration of the message (112)) or, if the orchestration activity does not have a response, an <orchestrationResponse> element in the body of the response. Thus, the response is either a "return" activity of the script, or a compile or runtime error generated by compiling or running the script.

Depending on the placement of the <orchestrate> element and the type of message, as has been described above, the BPE (118) determines whether a response to the message (112) is expected by the client (102) (step 208). If no response is expected, the process ends. If a response is expected, the BPE (118) returns the response to the client (102) (step 210) before the process ends.

The BPE (118) provides error handling capabilities, for example, if the href is invalid or cannot be found, or if the referenced script cannot be compiled. If a request has incorrectly formed XML, then a SOAP fault is returned with the fault string orchestrationEngine:unknownRequest. If an error occurs while compiling a script, then the return is a SOAP fault with the fault string orchestrationEngine:compileFailure. The details field can optionally be filled in with further details of the compilation error. If the href is valid but no script is found, then the return is a SOAP fault with the fault string orchestrationEngine:compileFailure. If the href is invalid, then the return from the getOrchestrationScript call is a SOAP fault with the fault string orchestrationEngine:invalidHref.

The <orchestrate> element can refer to message resources in multiple ways. Attachments include file contents and various attachment properties. The properties are used by clients to determine the nature of the content stored in the attachment, and to locate specific attachments among a set of attachments. The property used to distinguish one attachment from another is the Content-Id. In order to reference an attachment by its Content-Id, the URL is prepended with a "cid:". For example, 'cid:mycontentid' references an attachment with a Content-Id of 'mycontentid'.

Some implementations of the integration services network (106) include a document manager that acts as a repository for documents that can be accessed by clients (102) and web services (108; 110) that are connected to the integration services network (106). References to files stored in the document manager are read-only and use the format: file:<path>. The <path> refers to the organization that owns the file and the file name assigned to the file being referenced in the document manager. For example, if a company Acme, Inc. with a local integration service network domain of acme.com would like to refer a file labeled "foo.txt" that is stored in the document manager, the company would use the URL 'file:/acme.com/foo.txt'. If the local domain is omitted, then the organization name defaults to the local domain of the sender of the message. Therefore, the URL in this example could alternatively be 'file:foo.txt'. The caller referencing the file in the document manager must have sufficient access privileges to that file.

If data is stored within the SOAP envelope, a custom URL statement is used to reference the message part. The URL syntax can only identify XML parts/elements inside the SOAP envelope. The URL can identify either an element in the SOAP Body or the SOAP Header. The syntax is as follows:

'envelope:/(Header|Body)(/<child_element_name>)+ (∧ *)?', for example, ' envelope:/Body/foo/*'. The optional trailing asterisk ('*') identifies whether the referenced message part matches the named element (without the asterisk), or all of its children (with the asterisk). If an Envelope URL is used to identify a message part for storing output and the content being stored is plain text, then the content will be stored as the value of the identified element. If an Envelope URL is used to identify a message part for storing output and the content being stored is an XML document, then the XML document will be added as a child element to the element identified by the XPath URL.

Occasionally a request will specify a URL intending to reference a single message part, but the URL corresponds to more than one message part. This is, for example, the case if two attachments in the same message have identical Content-Id header values. In such an event, the integration service network (106) will use the first encountered message part and ignore all other matching message parts. Attachments and message parts referenced as inputs will be consumed by the integration service network (106) and will not be present in the response message.

If a client (102) specifies a message part to store information and that message part does not exist, then the message part will be created by the integration service network (106) in the response. If a client (102) specifies a message part for output and a message part with the same properties already exists in the request, then the existing message part will be replaced by the integration service network (106) in the response.

BPE Operation in the Virtual Mode

To use the BPE (118) in the virtual mode, a BPEL process with BPEL instructions is first created and uploaded to the BPE (118). Any number of messages (112) subsequently addressed to the uploaded BPEL process will be processed and orchestrated according to the uploaded set of instructions. Each invoking message (112) sent to the BPEL process results in a new instance of the router being created to orchestrate that message (112). All messages created by the BPE (118) are addressed from, and shown in reporting as being from the BPEL process associated with the orchestration instructions. The exact behavior of the BPE (118) varies according to whether the message (112) is a request or notification. In some cases, the BPEL process itself returns a response while in others none is sent. Also in the virtual mode, all connection security levels supported by the integration services network (106) are also supported. The BPEL script uploaded to the BPEL process must be well formed XML in the provision script call format expected by the BPE (118) and the web services (108; 110).

Figure 3:
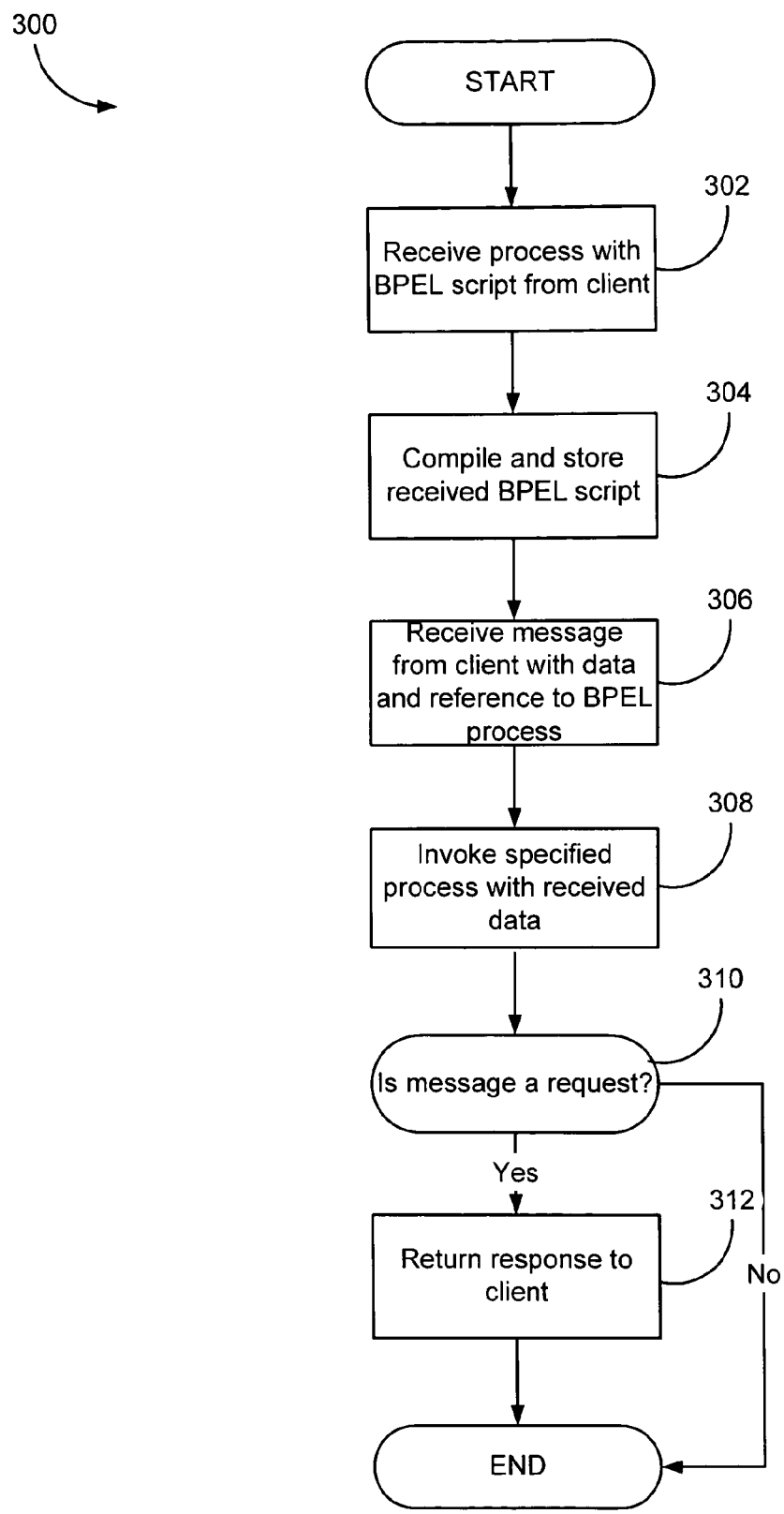
FIG. 3 is a flowchart that shows a schematic process for how the BPE operates in the virtual mode.

FIG. 3 is a flowchart that shows a schematic process (300) for how the BPE (118) operates in the virtual mode. As can be seen in FIG. 3, the process starts with the BPE (118) receiving a BPEL script from a client (102) through the integration services network (106) (step 302). The BPEL script is formatted as a call using a <provisionScript> element. The <provisionScript> element contains details of the script to be compiled and the name of the BPEL process with which the compiled script it is to be associated. If the virtual service has already been provisioned, the script preferably over-writes the existing script. In this case, running instances of the previous version of the script are unaffected. This message preferably is in the SOAP body. The BPE (118) compiles and stores the BPEL script for later use (step 204).

Next, a message (112) is received from the client (102) that contains a reference to a particular BPEL script, and some data to be acted upon by the script specified in the message (112) (step 306). The message (112) can be either a notification or a request. The BPE (118) invokes the specified script with the data provided in the message (112) and processes the data in the message in accordance with the script (step 308).

The process then checks whether the received message (112) is a request (step 310). If the message (112) is not a request, then the client (102) is not expecting any response from the BPE (118) and the process ends. If the message (112) is a request, a response is sent from the BPE (118) to the client (102) that issued the message (112) (step 312) before the process ends.

The BPE (118) provides error handling capabilities and referencing capabilities in the virtual mode that are similar to the error handling capabilities and referencing capabilities that have been described above for the direct invocation mode.

BPE Extensions

A number of extensions to the BPEL standard are recognized by the BPE (118) to simplify interaction with the web services (108; 110) that are connected to the integration services network (106). The extensions fall into the categories activities, expressions, and correlations. Activities are actions to be taken by the BPEL process, expressions are used to extract information that is specific to the integration services network (106), and correlations are used to associate instances of scripts with messages that fulfill specific criteria.

In accordance with the BPEL specification, all BPEL extensions have a particular namespace that is specific to the integration services network (106). In the method descriptions that follow, many parameters are described as strings and then illustrated with something like bpws:getVariableData('variable', 'part'). In this case, the string is evaluated by calling the method getVariableData, defined in the bpws namespace, and the result is used as the string argument. The interpretation of a string as a method is entirely dependent on the existence of the namespace definition, so should the literal string "bpws:getVariableData('variable', 'part')" be required to appear, then defining the bpws namespace with a different prefix would be required. All BPEL extensions may be used by either the direct or virtual mode with the exception of the correlation extension, which can only be used in the virtual service mode.

Activities

Activities describe actions to be taken by the orchestration process. The activities described below are described in a similar format to that of the descriptions of other activities in the core BPEL specification.

<InvokeService>

The InvokeService activity allows the business process to invoke a one-way or request-response operation on an arbitrary web service (108; 110) connected to the integration services network (106). Unlike the standard invoke activity, no WSDL is required for the service because the entire message (112) referenced by the inputVariable attribute is sent. The operation behaves similarly to the call operation in existing routing programs. The message (112) is sent to a web service (108; 110) whose name is specified in a serviceName attribute. The serviceName is specified in the integration service's web service directory (114). The type of the call made to the service is determined from the existence of an outputVariable attribute. No outputVariable implies a notification; otherwise the call is a request. If there is no outputVariable specified, a network acknowledgement (nack) attribute may be set to true, setting the corresponding element in the Post header of the notification message to the name of the integration services network (106). Specifying nack="true" for a request message results in a compilation error. A duration attribute sets a timeout or expiration field in the Post header of the call to the integration services network (106). This also implies a blocking limit for requests and nack messages. Neither nack nor duration are used directly by the BPEL service, but merely expose the underlying behavior of the integration services network (106). Correlations, catch, catchall and compensationHandler values are specified as defined in the BPEL specification. The invokeService call blocks until a response or nack is returned, if applicable.

<InvokeMulticast>

The invokeMulticast activity allows the business process to invoke a one-way or request/response operation on a number of arbitrary web services (108; 110) that are connected to the integration services network (106). The behavior of the call is identical to the behavior of the invokeService call, except that the recipients parameter is an array of organization/service names rather than just one organization/service name. The type of the call made to the service is determined from the existence of an outputVariable attribute. No outputVariable implies a notification; otherwise the call is a request. If there is no outputVariable specified, the nack attribute may be set to true, setting the corresponding element in the Post headers of the notification messages to the integration services network (106). Specifying nack="true" for a request message will generate an orchestrationEngine:compileFailure failure. The duration attribute sets the timeout or expiration field in the Post header of the call to integration services network (106). This also implies a blocking limit for requests and nack messages. Neither nack nor duration are used directly by the BPEL service, but merely expose the underlying behavior of the integration services network (106). The inner activity allows processing of responses, and is invalid if no responses are expected. No blocking activities are allowed at this point. Specifying this activity when no response is expected generates a fault. Correlations, catch, catchall and compensationHandler values are specified as defined in the BPEL specification. The invokeMulticast call blocks until all responses or nacks are returned, if applicable.

<InvokeSMTP>

The InvokeSMTP activity allows a business process to invoke an SMTP Web service connected to the integration services network (106). The message (112) is sent to a specified recipient email address from a specified email address and with the specified body as the email content. Optionally, a subject can be specified. Correlations, catch, catchall and compensationHandler values are specified as defined in the BPEL spec. This call is non-blocking.

<ForEach>

In order to allow processing of elements in an array, the ForEach activity has been added. This activity iterates through the sibling children of a named array variable, copying each element into another named variable that can be accessed using normal variable expressions.

Expressions

Again, to facilitate interacting with the integration services network (106), a number of additional expressions are defined. These expressions usually extract information that is specific to the integration services network (106) and that may help process invocations. As is the case with standard BPEL expressions, any attempt during process execution to use any part of a variable before the variable is initialized will result in an uninitialized variable fault.

AddVariableAttachment—

This expression adds a specified first variable as an attachment to a specified second variable and returns the specified second variable. An optional parameter can be specified to give the attachment a particular identifier.

AddVariableHeader—

This expression adds a first specified variable as a header to a specified second variable and returns the specified second variable. The optional values of soap actor "mustUnderstand" will be added if supplied; otherwise the values will default to null and false, respectively. If the attachment identifier is unique, the standard selection failure fault is thrown.

CountVariableAttachments—

This expression returns the number of attachments for a named message.

DeleteVariableAttachmentById—

This expression deletes the attachment with a specified identifier from a named variable and returns the named variable. If no attachment is found, or if the attachment identifier is not unique, a standard selection failure fault is thrown.

DeleteVariableAttachmentByNumber—

This expression deletes an attachment with a specified number from a named variable and returns the named variable. If no attachment is found, the standard selection failure fault is thrown.

GetFaultEventCode—

This expression returns the event code, if any, in the fault string of a named variable, assuming the variable is a network generated SOAP fault. If the variable is not generated by the integration services network, or if there is no referenced service name, the expression returns "0".

GetFaultServiceName—

This expression returns the referenced service name, if any, in the error string of the named variable, assuming the variable is a network generated SOAP fault. The expression returns null if the variable is not network generated, or if there is no referenced service name.

GetRouterAddress—

This expression returns the network address (organization/service) of this process.

GetRouterInvoker—

This expression returns the network address (organization/service) of the service that invoked the current instance of this process.

GetRouterSession—

This expression returns the network session ID of the current instance of this process.

GetVariableAttachmentByNumber—

This expression returns an attachment with a specified number (zero-based) from the named variable. If no such attachment is found, a standard selection failure fault is thrown.

GetVariableAttachmentById—

This expression returns an attachment with a specified identifier from the named variable. If no such attachment is found, the standard selection failure fault is thrown. If multiple attachments have the same attachment ID, the first such attachment is returned.

GetVariableAttachmentIds—

This expression returns an array of strings containing the identifiers of all attachments of a named variable. The array is empty if there are no attachments.

GetVariableCall—

This expression returns a network call identifier of the named variable. The value is read from the delivery header of the referenced variable.

GetVariableSender—

This expression returns a network address (organization/service) of the service that sent a named variable. The value is read from the delivery header of the referenced variable.

GetVariableSession—

This expression returns a network session identifier of the named variable. The value is read from the delivery header of the referenced variable.

GetVariableToken—

This expression returns a network token identifier of the named variable. The value is read from the delivery header of the referenced variable.

GetVariableTopic—

This expression returns the topic of the named variable. The value is read from the delivery header of the referenced variable.

GetVariableType—

This expression returns the message type of the named variable. The value is read from the delivery header of the referenced variable.

SetVariableExpiration—

This expression sets the expiration of the named variable. The value is inserted into the post header of the referenced variable the next time the variable is used in an invoke activity.

SetVariableTimeout—

This expression sets the timeout of a named variable. The value is inserted into the post header of the referenced variable the next time the variable is used in an invoke activity.

SetVariableTopic—

This expression sets the topic of a named variable. The value is inserted into the post header of the referenced variable the next time the variable is used in an invoke activity.

Correlations

Correlations in BPEL allow an instance of a script to be associated with all messages (112) that fulfill a specified criterion. For example, an invocation call can be given an Xpath query to determine the correct response to be matched to the request. This functionality is unnecessary in the context of the integration services network (106), since all responses have a correlation to their respective requests through a token in the delivery header. Therefore, correlation sets that are specified in terms of activities are ignored. A new correlation specifier is allowed at the global process level as a correlationSet element. GCCorrelation allows the topic or the session of a message (112) to be specified as a correlation identifier. If either the topic or the session is set, then all messages (112) sent to the virtual service associated with that script with the same session or topic will be processed by the same instance of the script. No other correlation specifiers are recognized at this level. No correlation specifiers are allowed for scripts in direct invocation mode.

SOAP Faults

Table 1 below lists the SOAP faults returned by the integration services network (106) during invocation of the BPE (118) and during BPEL script processing. BPEL fault catchers are found using the qualified name of the fault type and a message type. Since usually the only faults returned by the integration services network (106) are either soap:Server, or soap:Client, it would be hard to differentiate between, say, a delivery failure and a timeout message. In order to enable finer-grained fault handling than would be possible with the default errors, the BPEL service maps errors generated in the integration services network (106) to different qualified names. All the faults have a namespace URL that is specific to the integration services network (106), and a local name that is one of "post", "routing", "delivery", "response" or "timeout".

TABLE 1

| Local name | Description |
|---|---|
| Receipt | Receipt is for errors encountered during posting a message to the integration services network. |
| Routing | Routing is for errors encountered during processing of a message inside the integration services network. |
| Delivery | Delivery for errors encountered during delivery of a message inside the integration services network, except timeout errors. |
| Response | Response for errors encountered during routing of a message inside the integration services network, except timeout errors. |
| Timeout | Timeout for errors indicating that a message timed out or expired before it was delivered or before a response was received. |

Multicast Use Example of the BPE

Figure 4:
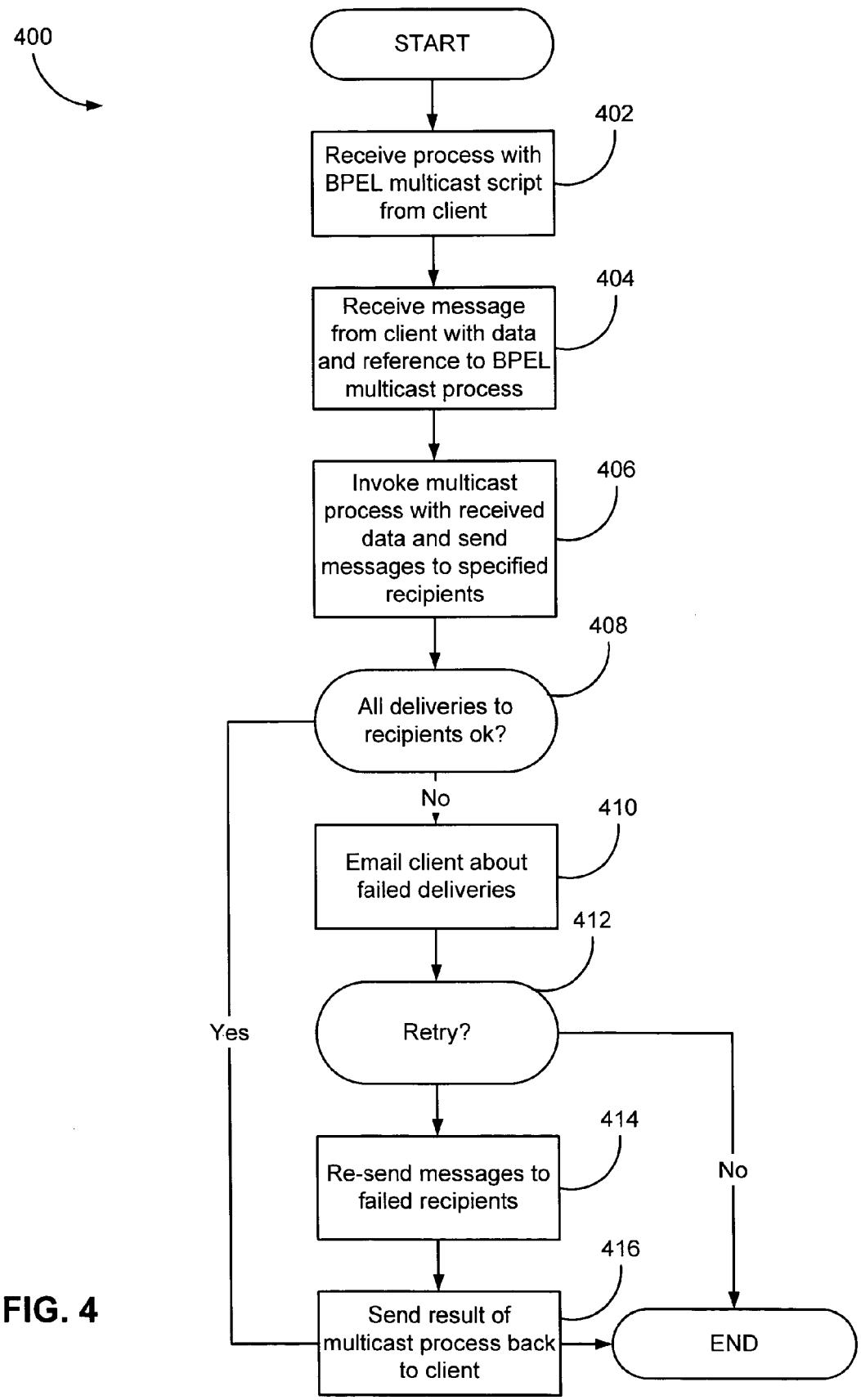
FIG. 4 is a flowchart that shows an exemplary multicast process.

This example demonstrates how to use the BPE (118) to broadcast a single message (112) to multiple recipients, such as web services (108; 110) with a retry capability. Additionally, the only way the client (102) sending out the message (112) wants to be alerted to any failures and be given the opportunity to re-send the message (112) is by email. This is achieved by having the catch block of the multicast message (112) send an email that contains a link to the web-based messaging screen of the initiating service. The web-based messaging page generates a notification, containing the name of the service whose delivery failed, that is sent to the BPE (118). The BPE (118) handles the notification as an asynchronous event and resends the original request to the service that failed delivery. FIG. 4 shows a flowchart of the multicast process (400). The actual multicast WSDL file and the multicast BPEL script will also be presented and discussed below.

As can be seen in FIG. 4, the process (400) starts with the BPE (118) receiving a multicast script from the client (102) (step 402). The multicast script will be discussed in detail below. Next, the BPE (118) receives a message (112) from the client (102) with data, such as an email message to be sent to multiple recipients, and a reference to the BPEL multicast script (step 404). The BPE (118) then invokes the multicast process with the received data and sends the message to the specified recipients (step 406).

The process then checks whether the messages have been received by all the intended recipients (step 408). If the messages have been properly received, the process proceeds to step 416, where the result of the multicast process, such as a combined response from all the recipients or a confirmation, is sent back to the originating client (102) (step 416), upon which the process ends. If the any of the recipients have not received a copy of the message from the BPE (118), the BPE (118) notifies the client (102) about which recipients did not receive the message by sending an email containing a retry link to the client (102) (step 410). The client (102) can then decide whether to try to resend the message to the failed recipients (step 412). If the client (102) decides not to resend the message (112), the process ends, but otherwise the message is resent (step 414). Optionally, the messages that could not be received can be resent automatically a certain number of times or during a certain time period. Finally, the process sends the result of the multicast process back to the client (102) (step 416).

Table 2 below shows a WSDL file that defines two messages. The first message invokes the initial multicast process and contains the recipients, how long the multicast message should live, and details on where to send an email message in the event of failure and how long to wait for a retry request. The other message contains a service address and tells the BPE (118) to re-send the initial message (112) to that service only. Note that there is no binding for the "retryPT" port type since it is called from web-based messaging, which does not require such a binding.

TABLE 2

| WSDL File |
|---|
| multicast.wsdl<br><main program logic><br><receive request message/><br><send the request message to every recipient specified in the request message><br>    <if a soapFault is thrown for a recipient,<br>        email a message to the address contained in the request<br>        message containing a URL which will lunch WBM to send<br>        a retry request. Sleep for retry wait duration.><br></main program logic><br><event handler><br><if a retry request arrives (out-of-bound), resend the<br>    request message to the recipient specified. Sleep for retry wait<br>    duration.><br>    <if a soapFault is thrown,<br>        email a message to the address contained in the request<br>        message containing a URL which will lunch WBM to send<br>        a retry request. Sleep for retry wait duration.><br></event handler> |

The process is defined by the Business Process script of Table 3 below, immediately preceding the claims section.

In Table 3, the BPEL script starts with a process definition of the "multicastProcess" and a listing of XML namespaces (xmlns) that are used by the multicast process. The next element describes a set of variables that are used by the process. The variables map internal variable names to external message variables that are defined in WSDL by this BPEL process and other processes that get invoked by this process.

The main logic of the process is defined inside the sequence element. The event handler defines asynchronous message handling, and in particular the generation of the retry email message that is sent to the client (102) in the event of a non-responsive recipient of the message (112). The receive element that follows the event handler contains instructions for receiving the message (112) from the client and creating an instance of the BPEL multicast process.

The next action is invoke multicast, which receives the list of recipients from the message (112) and sends a copy of the message (112) to each of the recipients (108; 110). A number of fault handlers are included so that if any of the recipients fail to receive the message, the various fault handlers are invoked. The copying of strings creates an email that is sent to the client (102) to tell the client (102) that a recipient (108; 110) failed to receive the message (112). As a result of clicking on that email, the message is brought back into the integration services network (106) and an asynchronous message is generated that goes back into the event handlers, which causes the original message (112) to be resent to the recipients (108; 110). This can occur multiple times, either until a time out occurs, or until a certain number of attempts has been made, or until the intended recipient receives the message.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

A number of implementations of the invention have been described. Nevertheless, it will be understood that various modifications can be made without departing from the spirit and scope of the invention. For example, the above processes have all been defined in terms of XML and BPEL, but any suitable language for expressing business processes, such as JAVA™ or JavaScript™ can be used. Accordingly, other embodiments are within the scope of the claims.

TABLE 3

Business Process Script

```
<process name="multicastProcess"
        targetNamespace="http://acme.com/orders"
        suppressJoinFailure="yes"
        xmlns="http://schemas.xmlsoap.org/ws/2003/03/business-process/"
        xmlns:bpws="http://schemas.xmlsoap.org/ws/2003/03/business-process/"
xmlns:gc="http://grandcentralservices.com/schemas/orchestration/1.0/"
        xmlns:soap="http://schemas.xmlsoap.org/wsdl/soap/"
        xmlns:wsdl="http://schemas.xmlsoap.org/wsdl/"
        xmlns:xsi="http://www.w3.org/2001/XMLSchema-instance"
        xmlns:gcf="http://grandcentral.com/faults"
        xmlns:lns="http://grandcentral.com/multicast">
   <variables>
     <variable name="request"
             messageType="lns:multicastMessage"/>
     <variable name="soapFault" messageType="soap:Fault"/>
     <variable name="resend"
             messageType="lns:multicastResendMessage"/>
     <variable name="bodyBuffer" type="xsi:string"/>
```

TABLE 3-continued

| Business Process Script |
|---|

```
    </variables>
    <sequence>
        <eventHandlers>
            <onMessage variable="resend" operation="retry">
                <gc:invokeService
                            recipient="bpws:getVariableProperty('resend',
'recipient', '\')"
                            inputVariable="request" type="notification">
                    <catch faultName="gcf:timeout"/>
                    <catch faultVariable="soapFault">
                        <sequence>
                            <assign>
                                <copy>
                                    <from expression="This message was generated
in response to a re-delivery failure of a multicast message to service
"/>
                                    <to variable="bodyBuffer"/>
                                </copy>
                                <copy>
                                    <from
expression="bpws:getVariableData(bodyBuffer) +
bpws:getFaultServiceName('soapFault')"/>
                                    <to variable="bodyBuffer"/>
                                </copy>
                                <copy>
                                    <from
expression="bpws:getVariableData(bodyBuffer) + 'Please click the link
below to re-send the message'"/>
                                    <to variable="bodyBuffer"/>
                                </copy>
                                <copy>
                                    <from
expression="bpws:getVariableData(bodyBuffer) +
'http://serveng01.dev.grandcentral.com/newPrePopMessageDetail.do?service
Id='"/>
                                    <to variable="bodyBuffer"/>
                                </copy>
                                <copy>
                                    <from
expression="bpws:getVariableData(bodyBuffer) + gc:getRouterInvoker( )"/>
                                    <to variable="bodyBuffer"/>
                                </copy>
                                <copy>
                                    <from
expression="bpws:getVariableData(bodyBuffer) +
'&editType=new&compostitionType=new&messageType=notification
&recipient='"/>
                                    <to variable="bodyBuffer"/>
                                </copy>
                                <copy>
                                    <from
expression="bpws:getVariableData(bodyBuffer) + gc:getRouterAddress( )"/>
                                    <to variable="bodyBuffer"/>
                                </copy>
                                <copy>
                                    <from
expression="bpws:getVariableData(bodyBuffer) + '&session='"/>
                                    <to variable="bodyBuffer"/>
                                </copy>
                                <copy>
                                    <from
expression="bpws:getVariableData(bodyBuffer) + gc:getRouterSession( )"/>
                                    <to variable="bodyBuffer"/>
                                </copy>
                                <copy>
                                    <from
expression="bpws:getVariableData(bodyBuffer) + '&topic=Resend
request&body=<nsms:multicastResendMessage
xmlns:nsms="http://grandcentral.com/multicast"><nsms:recipient>'"/>
                                    <to variable="bodyBuffer"/>
                                </copy>
                                <copy>
                                    <from
expression="bpws:getVariableData(bodyBuffer) +
bpws:getFaultServiceName('soapFault')"/>
                                    <to variable="bodyBuffer"/>
                                </copy>
                                <copy>
```

TABLE 3-continued

| Business Process Script |
| --- |

```
                <from
expression="bpws:getVariableData(bodyBuffer) +
'</nsms:recipient></nsms:multicastResendMessage>'"/>
                    <to variable="bodyBuffer"/>
                </copy>
            </assign>
            <gc:invokeSMTP
to="bpws:getVariableProperty('request', 'errorEmailAddress')"
                    subject="Multicast re-delivery failure"
body="bpws:getVariableData(bodyBuffer)"/>
                <wait for="bpws:getVariableProperty('request',
'retryWaitDuration')"/>
            </sequence>
        </catch>
      </gc:invokeService>
    </onMessage>
  </eventHandlers>
  <receive name="receive"
        portType="lns:multicastPT"
        operation="multicast" variable="request"
        createInstance="yes">
  </receive>
  <gc:invokeMulticast name="invokeRecipients"
      type="nack"
          inputVariable ="request" >
  <catch faultName="gcf:timeout"/>
  <catch faultVariable ="soapfault">
    <sequence>
      <assign>
        <copy>
            <from expression="This message was generated in response
to a re-delivery failure of a multicast message to service "/>
            <to variable="bodyBuffer"/>
        </copy>
        <copy>
            <from expression="bpws:getVariableData(bodyBuffer) +
bpws:getFaultServiceName('soapFault')"/>
            <to variable="bodyBuffer"/>
        </copy>
        <copy>
            <from expression="bpws:getVariableData(bodyBuffer) +
'Please click the link below to re-send the message'"/>
            <to variable="bodyBuffer"/>
        </copy>
        <copy>
            <from expression="bpws:getVariableData(bodyBuffer) +
'http://serveng01.dev.grandcentral.com/newPrePopMessageDetail.do?service
Id='"/>
            <to variable="bodyBuffer"/>
        </copy>
        <copy>
            <from expression="bpws:getVariableData(bodyBuffer) +
gc:getRouterInvoker( )"/>
            <to variable="bodyBuffer"/>
        </copy>
        <copy>
            <from expression="bpws:getVariableData(bodyBuffer) +
'&editType=new&compostitionType=new&messageType=notification
&recipient='"/>
            <to variable="bodyBuffer"/>
        </copy>
        <copy>
            <from expression="bpws:getVariableData(bodyBuffer) +
gc:getRouterAddress( )"/>
            <to variable="bodyBuffer"/>
        </copy>
        <copy>
            <from expression="bpws:getVariableData(bodyBuffer) +
'&session='"/>
            <to variable="bodyBuffer"/>
        </copy>
        <copy>
            <from expression="bpws:getVariableData(bodyBuffer) +
gc:getRouterSession( )"/>
            <to variable="bodyBuffer"/>
        </copy>
        <copy>
            <from expression="bpws:getVariableData(bodyBuffer) +
```

TABLE 3-continued

Business Process Script

```
'&topic=Resend request&body=<nsms:multicastResendMessage
xmlns:nsms="http://grandcentral.com/multicast"><nsms:recipient
>'"/>
            <to variable="bodyBuffer"/>
         </copy>
         <copy>
            <from expression="bpws:getVariableData(bodyBuffer) +
bpws:getFaultServiceName('soapFault')"/>
            <to variable="bodyBuffer"/>
         </copy>
         <copy>
            <from expression="bpws:getVariableData(bodyBuffer) +
'</nsms:recipient></nsms:multicastResendMessage> '"/>
            <to variable="bodyBuffer"/>
         </copy>
      </assign>
      <gc:invokeSMTP to="bpws:getVariableProperty('request',
'errorEmailAddress')"
         subject="Multicast re-delivery failure"
body="bpws:getVariableData(bodyBuffer)"/>
         <wait for="bpws:getVariableProperty('request',
'retryWaitDuration')"/>
      </sequence>
   </catch>
   <catchAll>
      <sequence>
         <assign>
         <copy>
         <from expression="This message was generated in response to a
delivery failure of a multicast message to an unknown recipient. This
error is probably not recoverable."/>
            <to variable="bodyBuffer"/>
            <from expression="bpws:getVariableData(bodyBuffer) + 'The
session id of the message is ' + bpws:getRouterSession( )"/>
            <to variable="bodyBuffer"/>
         </copy>
      </assign>
         <gc:invokeSMTP to="bpws:getVariableProperty('request',
'errorEmailAddress')"
            subject="Multicast delivery failure"
body="bpws:getVariableData(bodyBuffer)"/>
      </sequence>
   </catchAll>
   </gc:invokeMulticast>
</sequence>
</process>
```

The invention claimed is:

1. A method for communicating with a plurality of services via an integration services network, the method comprising:

receiving, via the integration services network, a business process definition describing a business process at a business process engine, the business process comprising a set of business-related activities which are invocable for achieving a business goal, the business process configured to operate on data associated with a client device in communication with the integration services network, wherein:

the business process engine is configured to retrieve a description of a first communication model and a second communication model from an information repository accessible to the business process engine, the information repository storing access information for a plurality of services, the access information comprising the first and second communication models, the access information further comprising policy information specifying a first subset of the plurality of services that may be invoked by the client device, the business process engine is configured to determine whether the first subset of the plurality of services comprises a first service and a second service, and the first and second services are invoked only when the first subset of services comprises the first and second services;

receiving, via the integration services network, from resources associated with the business process engine:

communication protocol information indicating the first communication model and the second communication model different from the first communication model, the communication protocol information being inaccessible to the client device via the integration services network, and information indicating aggregation information for the first communication model and the second communication model;

invoking, via the integration services network, the first service to implement the business process, the first service capable of communicating with the business process engine using the first communication model;

invoking, via the integration services network, the second service to further implement the business process, the second service capable of communicating with the business process engine using the second communication model, the invoking of the second service comprising providing data received by the business process engine from the first service;

aggregating, based on the aggregation information, two or more responses received from the first and second services into an aggregated response; and transmitting the aggregated response to the client device.

2. The method recited in claim 1,
wherein the first communication model comprises a first communication protocol or a first message format; and
wherein the second communication model comprises a second communication protocol or a second message format.

3. The method recited in claim 1,
wherein the business process definition is stored in the information repository; and
wherein the business process definition is available for a plurality of invocations with different sets of data associated with the client device.

4. The method recited in claim 1,
wherein the first service communicates with the business process engine using synchronous communications; and
wherein the second service communicates with the business process engine using asynchronous communications.

5. The method recited in claim 1, the method further comprising:
monitoring resources used in the processing of at least a portion of the data during the invoking of the first and second services; and
terminating the invoking of the first or second service if the resource usage exceeds a predetermined threshold value.

6. The method recited in claim 1,
wherein the first and second services are controlled by first and second independent service providers, the first and second independent service providers being independent of a service provider of the integration services network and being independent of the client device.

7. The method recited in claim 1,
wherein one or more of the first subset of services is provided by a service provider of the integration services network.

8. The method recited in claim 1, the method further comprising:
receiving a request to initiate an operation for implementing the business process from the a computing device associated with the client device, the request indicating the data operated on by the business process.

9. The method recited in claim 1, the method further comprising receiving an indication of:
one or more activities describing actions to be performed during invoking of the first and second services, and
one or more correlations for associating instances of business process definitions with messages that fulfill specific criteria, wherein the business process is implemented in accordance with the received indication.

10. An integration services network system configured to communicate with a plurality of services, the integration services network system comprising:
a description of a first communication model and a second communication model from an information repository, the information repository storing access information for a plurality of services, the access information comprising the first and second communication models, the access information further comprising policy information specifying a first subset of the plurality of services that may be invoked by a client device;
a business process engine configured to implement a business process described by a business process definition, the business process comprising a set of business-related activities which are invocable for achieving a business goal, the business process configured to operate on data associated with the client device in communication with the integration services network, the business process engine being configured to invoke the first subset of the plurality of services to implement the business process, the first subset of the plurality of services comprising:
a first service to implement the business process, the first service capable of communicating with the business process engine using the first communication model;
a second service to further implement the business process, the second service capable of communicating with the business process engine using the second communication model different from the first communication model, the second service capable of providing data received by the business process engine from the first service;
wherein the first and second services are invoked only when the first subset of services comprises the first and second services; and
wherein the business process engine is further configured to:
receive, from resources associated with the business process engine:
communication protocol information indicating the first communication model and the second communication model, the communication protocol information being inaccessible to the client device, and
information indicating aggregation information for the first communication model and the second communication model;
aggregate, based on the aggregation information, two or more responses received from the first and second services into an aggregated response; and
transmit the aggregated response to the client device.

11. The integration services network system recited in claim 10,
wherein the first communication model comprises a first communication protocol or a first message format; and
wherein the second communication model comprises a second communication protocol or a second message format.

12. The integration services network system recited in claim 10,
wherein the business process definition is stored in the information repository; and
wherein the business process definition is available for a plurality of invocations with different sets of data associated with the client device.

13. The integration services network system recited in claim 10,
wherein the first service communicates with the business process engine using synchronous communications; and
wherein the second service communicates with the business process engine using asynchronous communications.

14. The integration services network system recited in claim 10, wherein the business process engine is further configured to:
monitor resources used in the processing of at least a portion of the data during the invoking of the first and second services; and
terminate the invoking of the first or second service if the resource usage exceeds a predetermined threshold value.

15. The integration services network system recited in claim 10,
wherein the first and second services are controlled by first and second independent service providers, the first and second independent service providers being independent of a service provider of the network and being independent of the client device.

16. One or more non-transitory computer readable media having instructions stored thereon, the instructions configured to cause a method to be performed for communicating with a plurality of services via an integration services network, the method comprising:
receiving, via the integration services network, a business process definition describing a business process at a business process engine, the business process comprising a set of business-related activities which are invocable for achieving a business goal, the business process configured to operate on data associated with a client device in communication with the integration services network wherein:
the business process engine is configured to retrieve a description of a first communication model and a second communication model from an information repository accessible to the business process engine, the information repository storing access information for a plurality of services, the access information comprising the first and second communication models, the access information further comprising policy information specifying a first subset of the plurality of services that may be invoked by the client device,
the business process engine is configured to determine whether the first subset of the plurality of services comprises a first service and a second service, and
the first and second services are invoked only when the first subset of services comprises the first and second services;
receiving, via the integration services network, from resources associated with the business process engine:
communication protocol information indicating the first communication model and the second communication model different from the first communication model, the communication protocol information being inaccessible to the client device via the integration services network, and
information indicating aggregation information for the first communication model and the second communication model;
invoking, via the integration services network, the first service to implement the business process, the first service capable of communicating with the business process engine using the first communication model;
invoking, via the integration services network, the second service to further implement the business process, the second service capable of communicating with the business process engine using the second communication model, the invoking of the second service comprising providing data received by the business process engine from the first service;
aggregating, based on the aggregation information, two or more responses received from the first and second services into an aggregated response; and
transmitting the aggregated response to the client device.

17. The one or more non-transitory computer readable media recited in claim 16,
wherein the first communication model comprises a first communication protocol or a first message format; and
wherein the second communication model comprises a second communication protocol or a second message format.

18. The one or more non-transitory computer readable media recited in claim 16,
wherein the business process definition is stored in the information repository; and
wherein the business process definition is available for a plurality of invocations with different sets of data associated with the client device.

19. The one or more non-transitory computer readable media recited in claim 16,
wherein the first service communicates with the business process engine using synchronous communications; and
wherein the second service communicates with the business process engine using asynchronous communications.

* * * * *